Feb. 3, 1948.　　　H. B. HOLTHOUSE　　　2,435,277
HEATING AND IGNITION CONTROL SYSTEM
Filed July 12, 1943　　　4 Sheets-Sheet 1

INVENTOR.
HARRY B. HOLTHOUSE
BY
ATTORNEY

Feb. 3, 1948.    H. B. HOLTHOUSE    2,435,277
HEATING AND IGNITION CONTROL SYSTEM
Filed July 12, 1943    4 Sheets-Sheet 2
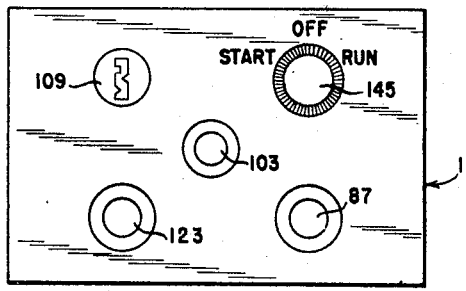
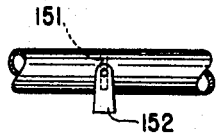
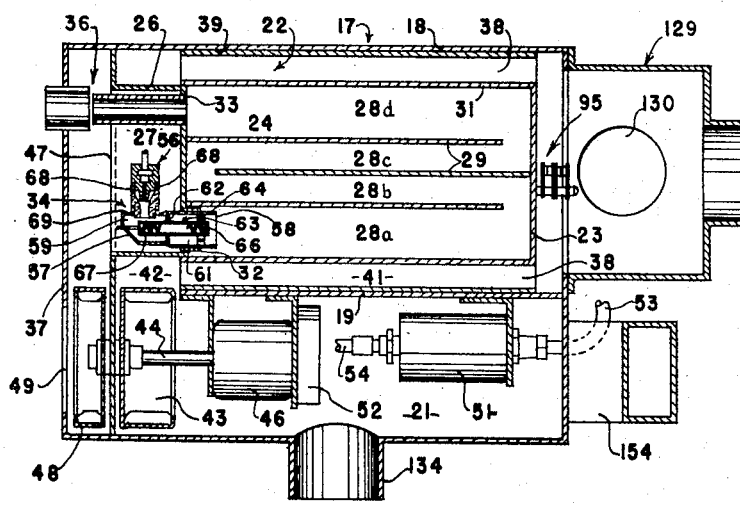
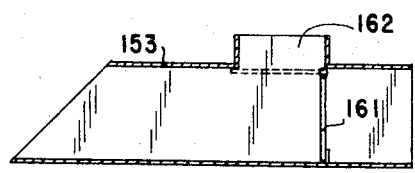
INVENTOR.
HARRY B. HOLTHOUSE
BY
*Foorman L. Mueller*
ATTORNEY Feb. 3, 1948.   H. B. HOLTHOUSE   2,435,277
HEATING AND IGNITION CONTROL SYSTEM
Filed July 12, 1943   4 Sheets-Sheet 3

INVENTOR.
HARRY B. HOLTHOUSE
BY
ATTORNEY

Feb. 3, 1948.  H. B. HOLTHOUSE  2,435,277
HEATING AND IGNITION CONTROL SYSTEM
Filed July 12, 1943  4 Sheets-Sheet 4

INVENTOR.
HARRY B. HOLTHOUSE
BY
Foorman L. Mueller
ATTORNEY

Patented Feb. 3, 1948

2,435,277

UNITED STATES PATENT OFFICE 2,435,277

HEATING AND IGNITION CONTROL SYSTEM

Harry B. Holthouse, Chicago, Ill., assignor to Motorola, Inc., a corporation of Illinois Application July 12, 1943, Serial No. 494,325

15 Claims. (Cl. 123—179)

The present invention relates generally to control systems and in particular to a control system for starting a battery-operated engine of internal combustion type at cold temperatures. This invention is a continuation-in-part of my copending application Serial No. 465,993, filed November 18, 1942, now abandoned.

Mobile craft generally include an internal combustion engine and an associated battery for starting the engine and for supplying electrical energy to the electric discharge or spark means in the engine ignition circuit. In a mobile craft equipped with a twelve volt battery the ignition circuit usually has an ignition coil or like voltage step-up means adapted, when a pressure of about ten volts is applied on the coil, to provide adequate ignition at the spark discharge means for engine starting and operating purposes. So long, therefore, as a voltage of about ten volts is maintained on the coil when the engine is cranked, engine starting is generally successful. However, it is well known that the effective capacity of a battery is reduced with cold temperatures. Thus at cold temperatures, when the capacity of the battery is reduced below a value capable of delivering ten volts at the ignition coil, the ignition for engine starting purposes is inadequate even though the battery is able to turn the engine over. It has been found that at temperatures of −20° F. and lower that the engine is practically non-startable and at times cannot even be turned over because of the reduced electrical energy in the battery and the increased mechanical friction in the engine and engine starting motor resulting from the decreased viscosity of the oil used in lubricating the engine and starting motor. Many attempts have been made to overcome these engine starting difficulties at cold temperatures but so far these attempts have been unsuccessful.

It is an object of this invention, therefore, to provide an improved system for starting a battery-operated internal combustion engine at cold temperatures.

Another object of this invention is to provide an improved starting system for a battery-operated engine in which adequate ignition for engine starting is provided at the lowest effective capacity of the battery capable of turning the engine over.

Yet another object of this invention is to provide an improved system for starting a battery-operated engine at cold temperatures, in which an electrical heating device of combustion type using the engine battery as a sole source of power is operable, at an effective capacity less than the lowest effective capacity which will turn the engine over, to heat the battery until it is capable of operating at such lowest effective capacity.

According to another object of the invention, facilities are provided for utilizing the heat energy produced by the heater to heat the liquid coolant in the cooling system of the engine, thereby to decrease the load imposed upon the battery during starting of the engine.

In accordance with still another object of the invention, facilities are provided whereby the heated air which is directed from the heater into engagement with the battery may be selectively used to heat one of the compartments of the vehicle in which the power plant is provided or may be recirculated through the heater for further heating.

According to a still further object of the invention, facilities are provided whereby the ignition system for the heater may be operated to produce fuel combustion within the heater either at the normal terminal voltage of the battery or at a much lower battery voltage, thereby to insure starting of the heater under extremely low temperature conditions.

A further object of this invention is to provide a system for starting a battery-operated engine at cold temperatures which is simple to operate, positive in operation, and which is adapted to use the available battery energy to its fullest extent for engine starting purposes.

A feature of this invention is found in the provision of a system for starting a battery-operated engine at cold temperatures, in which adequate starting ignition for the engine is provided whenever the battery is strong enough to turn the engine over. When the effective capacity of the battery, because of cold temperatures, is too low for turning the engine over electrical heating means of internal combustion type operated entirely from the battery, is adapted to heat the battery and engine to increase the effective capacity of the battery to an engine starting value and to reduce the mechanical friction in the engine.

Yet another feature of this invention is found in the provision of a heating system for a mobile craft capable, at cold temperatures, of heating the starting battery for the engine of the craft to increase the effective capacity of the battery to a value capable of starting the engine, and for selectively directing the heat from the battery to the craft passenger compartment to maintain the increased effective capacity of the battery concurrently with a heating of the passenger compartment.

Further objects, features, and advantages of this invention will become apparent from the following description when taken in connection with the accompanying drawings in which:

Fig. 2 is a longitudinal sectional view of the heating means used in the engine starting system of this invention, with the combustion portion of the heating means being shown in development for the purpose of clarity;

Fig. 3 is an elevational view of a control unit for the starting system of this invention;

Fig. 4 is a fragmentary detail view of a valve means used in the heat distributing system of the heating means shown in Fig. 2;

Fig. 5 is a detailed view of a valve means for controlling the return of heated air from the engine compartment of the automobile to the heating means shown in Fig. 2;

Figure 1:
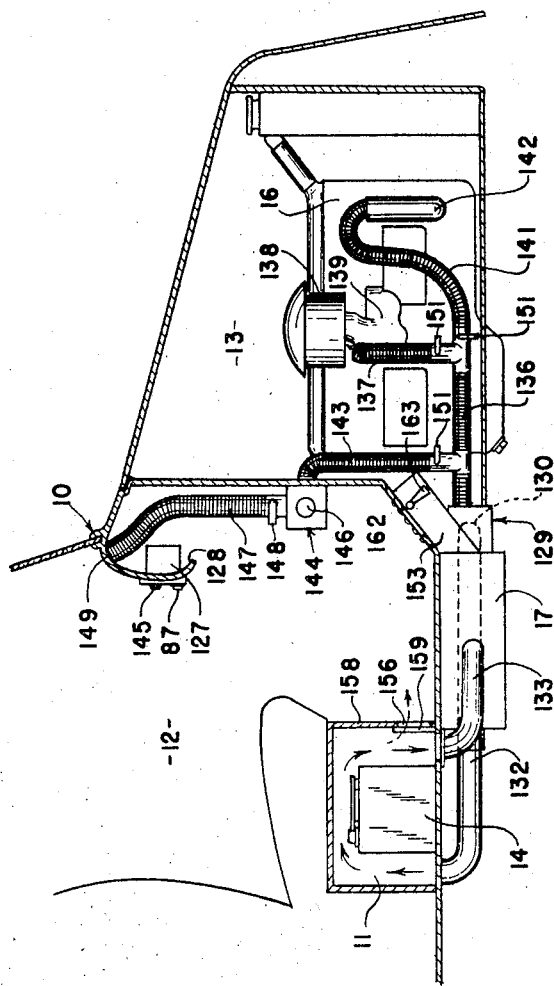
Fig. 1 is a fragmentary sectional view of an automobile body showing the relative assembly therein of the engine starting system of this invention.

As mentioned above the ignition circuit for an engine having a twelve volt operating battery normally includes an ignition coil requiring about ten volts to provide a satisfactory starting spark at the spark discharge means with which it is connected. When this voltage applied on the ignition coil drops below about ten volts the effectiveness of the spark at the discharge means for engine starting and operation is of course reduced. The supply voltage on the coil varies with the charged condition of the battery and the temperature conditions under which the battery operates. Thus at cold temperatures, the effective capacity of the battery, even though reduced, may be sufficient to turn the engine over but if it is insufficient to operate the ignition coil at about ten volts the engine will not start. To successfully and quickly start the engine, therefore, it is necessary that the engine ignition be adequate whenever the battery is capable of turning the engine over.

Battery readings as to amperage drain and resulting voltage under various temperature conditions are usually taken at the battery terminals when the battery is shorted. These readings are not entirely accurate in indicating the effective capacity of the battery for starting the car engine since the circuit for the engine starting motor may require an amperage drain which greatly decreases the amperage rating indicated at the battery terminals. This indicated amperage rating, therefore, does not give the true value of the total amperage drain required for starting. Thus it has been found that a voltage of ten volts at the battery terminals might indicate only about five volts at the ignition coil. Since the drain on the battery to operate the engine may vary from three hundred and twenty-five amperes to about four hundred and twenty-five amperes, a voltage on the order of five volts is not only incapable of providing adequate ignition, but also is incapable of forcing the required engine starting amperage through the engine starting circuit.

These difficulties in engine starting at cold temperatures have been overcome in the present invention by the provision of an engine ignition circuit in the starting system which provides an adequate ignition at the lowest effective capacity of the battery which is capable of turning the engine over. The ignition coil in the ignition circuit is normally connected in series with a ballast resistor which functions to control the energy applied on the ignition coil from the battery. When the battery energy is low the ballast resistor is shorted so that the full available battery energy is applied on the coil. As a result of this shorting of the ballast resistor there is a boost in the battery energy applied on the ignition coil at reduced effective capacities. Since the effective capacity is reduced with cold temperatures the invention contemplates further the provision of electrical heating means of internal combustion type which uses the engine battery as a sole source of supply, and is operable from the battery when the effective capacity of the battery is less than the lowest effective capacity which will turn the engine over. The electrical heater is thus capable of being operated, when the battery is too weak to turn the engine over, to heat the battery and in turn increase its effective capacity until the battery is strong enough to start the engine. The heating means operates with a starting drain on the battery of about twenty amperes and during normal operation has a current demand of only about eight and one-half amperes. By virtue of this very low amperage drain the heater can be operated from the battery at a reduced effective capacity without materially reducing the charge on the battery while it is being heated. Concurrently with the heating of the battery the heating means also delivers heat directly to the engine so as to reduce its mechanical friction at cold temperatures.

With reference to the drawings the engine starting system of this invention is shown in Fig. 1 as applied to a mobile craft having a body 10 including a battery compartment 11, a passenger or operator's compartment 12, and an engine compartment 13. A battery 14 in the compartment 11 is of usual storage type and is associated with an engine 16, located in the engine compartment, to start and maintain the operation of the engine. A heater of internal combustion type for heating the battery and engine at cold temperatures, and operated entirely by the battery 14, is indicated as 17.

The heater 17, shown in detail in Fig. 2, includes a housing 18 which is divided longitudinally over substantially its complete length by a vertically extending partition member 19 into a mechanical compartment 21 and a heating compartment. A substantially cylindrically shaped combustion chamber 22, shown in development in Fig. 2 for the purpose of clarity, is located within the heating compartment and is closed at one end by a cover plate 23 and at its opposite end by the bottom 24 of a substantially cup-shaped member 26. The member 26 defines in part an air supply chamber 27 which is in axial alignment with the combustion chamber 22.

The combustion chamber 22 is divided longitudinally into four axially extending but connected passages 28a—28d by a partition member 29. The partition member 29 is of a substantially X-shape and has its opposite side portions fixed within the body portion 31 of the combustion chamber. The combustion chamber inlet 32 and outlet 33 are formed in the bottom portion 24 of the cup-shaped member 26 and are in communication with the passages 28a and 28d, respectively. Located within the inlet 32 is an air and fuel mixing means indicated generally as 34, which exends within the air supply chamber 27 and combustion passage 28a. The outlet 33 of the combustion chamber is provided with an exhaust pipe assembly 36 which extends through the air supply chamber 27 and the end 37 of the heater housing 18. Heat radiating fins 38 are angularly spaced about the outer periphery of the combustion chamber body portion 31 and extend longitudinally of the combustion chamber. A sleeve 39 is positioned about the outer ends of the fins 38 to form an annular passage 41 about the combustion chamber for air to be heated.

The air to be heated enters the passage 41 from an annular chamber 42, which is connected with the mechanical compartment 21, and is circulated through the passage 41 by a blower 43 located within the compartment 21 and mouned on a shaft 44 of a motor 46. The heated air is discharged from the passage 41 at the outlet 129. The compartment 21 and chamber 42 are separated from the air supply chamber 27 by a partition member 47 extended transversely of the housing 18 and having an opening therein for receiving the open end of the cup-shaped member 26.

The air supply chamber 27 receives air from a blower 48 located in the air supply chamber and mounted on the motor shaft 44 which is journaled in the partition plate 47. An inlet 49 for the blower 48 is provided in the housing end 37. It is seen, therefore, that the blowers 43 and 48 are operated by the common electric motor 46 and are mounted directly on the motor shaft 44.

The motor 46 is also used in the operation of a fuel pump 51 which is illustrated in Fig. 2 as being of solenoid type. It is to be understood, of course, that any elecrically operated pump may be used. A breaker assembly 52 for controlling the energization of the pump 51 is operatively connected with the motor shaft 44. Fuel for the pump 51 is supplied from a suitable source such as a fuel tank (not shown) for the mobile craft through a pipe 53 and is delivered through a pipe 54 to a fuel injection nozzle 56 formed as a part of the air and fuel mixing means 34.

The air and fuel mixing means 34 includes a substantially tubular shaped housing member which is closed at one end 57 and open at the opposite end 58. A mixing chamber 59 at the closed end of the housing is separated from an equalizing chamber 61 by a perforated plate 62. The equalizing chamber 61 is in turn both defined and separated from the combustion chamber passage 28a by a perforated heat insulating plate 63 spaced inwardly from the open end 58 of the mixing means 34. A combination heating and igniting unit 64 is extended axially through the conditioning means 34 and is supported in the partition plates 62 and 63. This combination unit includes a resistance coil 66 which is supported in a spaced relation within a metal tube 67.

In the operation of the air and fuel mixing means 34 the fuel delivered to the nozzle 56 is directed into the mixing chamber 59. The fuel nozzle is located within the air supply chamber 27 and a portion of the air for mixing with the fuel enters the nozzle 56 from the air chamber 27 through ports 68 and travels with this fuel into the mixing chamber 59. Additional air from the air chamber 27 is admitted directly into the mixing chamber 59 through ports 69 formed about the fuel injection nozzle. The fuel within the mixing chamber 59 is heated to at least a fuel vaporing temperature by the combination unit 64 to provide for a thorough mixing of the fuel with the air in the mixing chamber. The casing for the conditioning means 34, the partition plate 62 and metal tube 67 are all composed of a heat conducting material so as to readily receive and conduct the heat radiated by the resistance coil 66 to substantially all portions of the mixing means 34. The resultant vaporous air and fuel mixture passes through the perforated plate 62 into the equalizing chamber 61 which in cooperation with the perforated heat insulating plate 63 serves to reduce the turbulence in the mixture and to disperse the mixture substantially uniformly over the open end 58 of the conditioning means 34. This combustible mixture passes through the apertured plate 63 and across the open end of the tube 67 into the effective igniting zone of the combination unit 64 which functions as a heat gun. In other words the heat developed by the coil 66 is projected outwardly from the open end of the tube 67, the heat generated being dependent upon the watt input to the resistance coil 66. The combustible mixture is thus ignited by virtue of the temperature at the open end of the tube 67 being of a degree capable of igniting the fuel mixture. In one embodiment of the heater the air in the air supply chamber 27 is at a pressure of about two inches of water. Since this pressure alone acts to impart motion to all of the exhaust gases in the combustion chamber 22 combustion takes place at substantially atmospheric pressure.

It is apparent from the above description that a quick starting and efficient operation of the heater apparatus is dependent upon a positive operation of the coil 66 to heat the conditioning means 34 to at least a fuel vaporizing temperature. It follows also that the sooner the coil can be operated at an optimum temperature, the less delay there will be in starting the operation of the heater. Where a battery is utilized as the sole source of power supply for the heater the electrical energy for operating the heater is limited entirely by the available effective capacity of the battery. The effective capacity varies over relatively wide limits defined by a low and high charge condition of the battery. Further variation takes place because of the reduction in the effective capacity at cold temperatures. Thus assuming a battery 14 to have a normal pressure of twelve volts, its effective capacity would vary from a low charge condition of eight volts to a high charge condition of sixteen volts. If coil 66 is constructed to operate at twelve volts it would operate satisfactorily between twelve volts and sixteen volts but at eight volts would not operate at all, or would take considerable time in reaching an optimum temperature to prepare the fuel for burning. A coil capable of being heated to a substantially maximum temperature at eight volts would operate at an overload above this voltage and would burn up when sixteen volts were applied to it. These difficulties in the operation of the coil 66 are overcome in the present invention by means now to be described in connection with the control circuit in Fig. 6.

Figure 6:
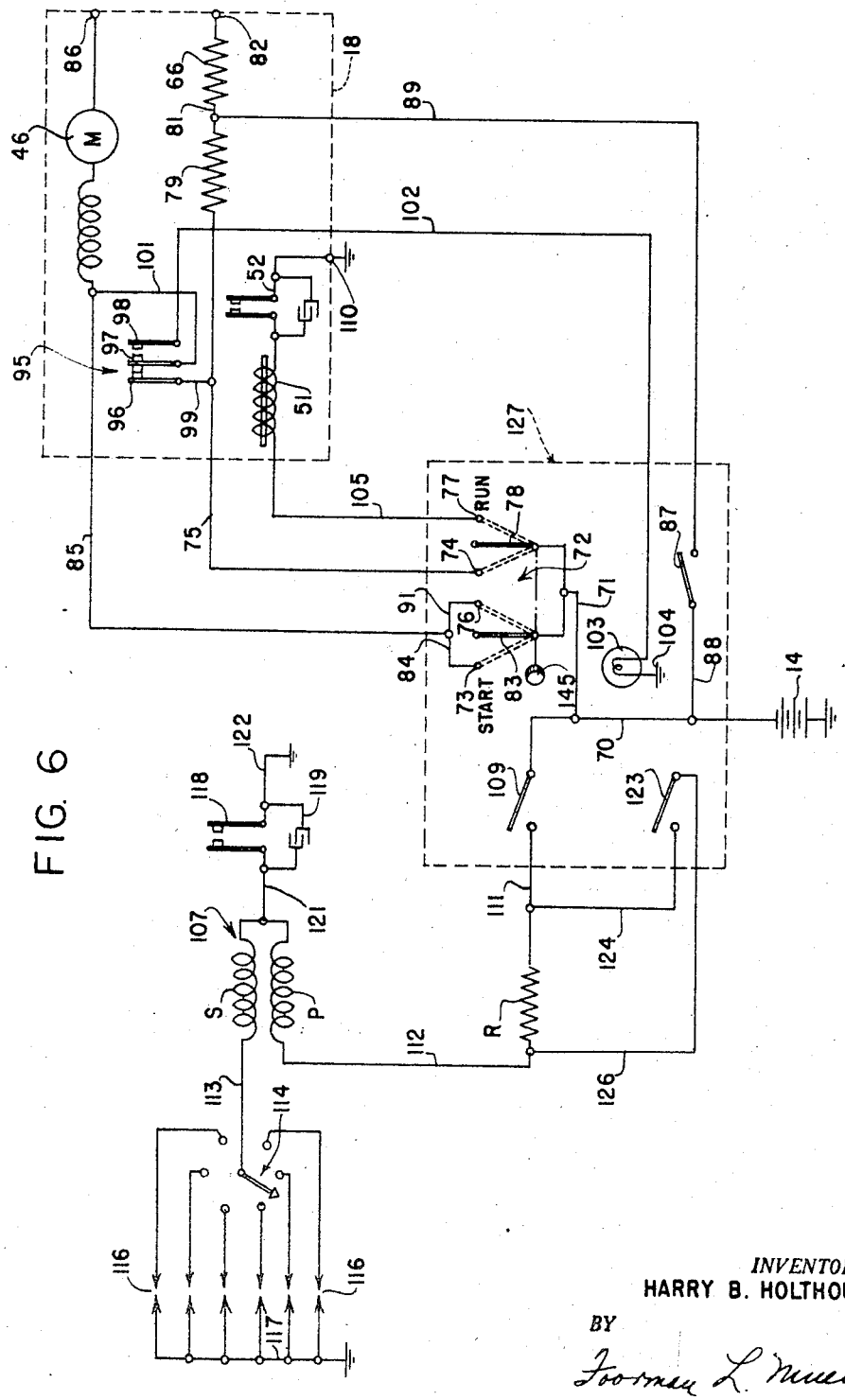
Fig. 6 illustrates diagrammatically the control circuit for the starting system of this invention.

As shown in Fig. 6 the control system for the heater 17, from the battery 14, includes a power lead 70 which is connected by a conductor 71 to a double-throw double-pole switch 72 having corresponding pairs of terminals 73 and 74, and 76 and 77. The switch 72 in a position for starting the operation of the heater completes the circuit for the heating coil 66 from the conductor 71 through a switch arm 78, terminal 74, conductor 75, a resistor 79, a conductor 81, the heating coil 66, and a ground connection 82 on the heater housing 18. The motor circuit is also closed at the starting of heater operation and includes the conductor 71, the switch arm 83, terminal 73, conductors 84 and 85, the motor 46 and a ground connection 86. The motor 46 and the heating coil 66 are thus concurrently operated when the switch 72 is in a "start" position, the circuit for the pump 51 being open. In order to heat the coil 66 to a temperature sufficient to vaporize the fuel admitted into the conditioning or mixing means 34, regardless of the charged condition of the battery 14 and under cold temperature conditions, it is of a construction adapted to be operated at eight volts. The resistor 79, series connected with the heating coil has resistance characteristics providing for a four volt drop so that when the battery is at twelve volts, eight volts is applied on the coil 66. This resistance, of course, can be varied to any amount depending upon the normal operating voltage of the coil 66. Thus with the battery 14 at a normal pressure of twelve volts and with the switch 72 in its "start" position only eight volts are applied on the heating coil 66 which at this voltage has normal operation. With the battery in a high charged condition, of course, the coil 66 will operate at an overload which, however, is not sufficiently great to injure the coil.

A thermostatic switch 95 responsive in operation to the combustion conditions in the heater 17 is located in a heat exchange relation with the combustion chamber 22 as shown in Fig. 2 and includes a bimetal contact arm 97 normally closed with a contact arm 96, and a contact arm 98 normally open relative to the bimetal contact arm 97. The contact arm 96 is connected by conductors 99 and 75 to the switch terminal 74, and contact arm 97 is connected by a conductor 101 to the conductor 85 which in turn is connected to the terminal 73. Contact arm 98 is connected by a conductor 102 to a pilot lamp 103 having a ground connection 104.

When the switch 72 is in a "start" position, the thermostatic switch 95 is shorted across the terminals 73 and 74 so that it has no control function when the heater 17 is first started. After preheating the conditioning means 34 by the operation of the heating coil 66 with only that part of the electrical energy of the battery 14, as determined by the resistance 79, the switch 72 is moved to a "run" position. With the switch 72 in a "run" position the circuit for the heating coil is completed from conductor 71, through the switch arm 83, terminal 76, conductors 91, 85, and 101, contact arms 97 and 96, conductors 99 and 75, resistor 79, conductor 81, the heating coil 66, and ground connection 82. The operation of the coil 66, therefore, is dependent upon the contacts 96 and 97 being closed. The circuit for the motor 46 from the conductor 71 is completed through switch arm 83, terminal 76, and conductor 91, the rest of the circuit from the conductor 91 being the same as when the switch 72 is in a "start" position. The circuit for the pump 51 from the conductor 71 includes the switch arm 78, terminal 77, conductor 105, the pump 51, the breaker assembly 52 and a ground connection 110. With the heating coil 66 connected in series with the resistor 79 for both the "start" and "run" positions of the switch 72 heating of the conditioning means 34 is initially accomplished by the use of only a part of the battery energy. Should the coil 66 with this partial battery energy fail to heat the conditioning means 34 to at least a fuel vaporizing temperature so that combustion does not occur when the fuel pump 51 is operated, the switch 87 is momentarily closed to shunt the resistor 79 and apply substantially the full energy of the battery 14 on the heating coil.

The circuit for the switch 87 from the power lead 70 includes conductor 88, the switch 87, and conductor 89 which is connected to the conductor 81 intermediate the heating coil 66 and the resistor 79. With the switch 72 in a "run" position, and without combustion taking place, the switch 87 is closed until combustion starts. This closing of the momentary switch 87 provides for an immediate boost in the energy supplied to the heating coil 66, to in turn increase its heat output, so that the fuel in the mixing chamber 59 of the conditioning means 34 is immediately vaporized for burning. When combustion is started as the result of the increased battery energy applied on the coil 66 the momentary switch 87 is released.

Since the thermostatic switch 95 is responsive in operation to the combustion conditions in the combustion chamber 22, coil 66 after release of the switch 87 will continue to operate in series with the resistor 79. This operation of the coil continues until the bimetal contact arm 97 moves away from the contact arm 96 to open the circuit of the heating coil at the thermostatic switch. In moving away from the contact 96, the contact 97 engages the contact 98 to close the circuit of the pilot light 103, with the lighting of the pilot lamp visually indicating to the operator of the system that combustion has been started and normal operation of the heater accomplished. On the cooling of the combustion chamber 22 below a predetermined temperature value corresponding to substantially a fuel vaporizing temperature for the conditioning means 34, the bimetal arm 97 is cooled and moves to the left, as viewed in Fig. 6, to disengage contact 98 and engage the arm 96 to open the pilot lamp circuit and close the heating coil circuit through the resistor 79. Going out of the light 103, therefore, indicates a loss of combustion in the heater and the energization of the coil 66 by only a part of the battery energy.

When the effective capacity of the battery is relatively high, sufficient heat will be developed by the coil 66, with only a part of the battery energy applied thereon, to heat the conditioning means 34 to an optimum temperature so that combustion will be automatically regained by the operation of the thermostatic switch 95. However, if after a period of operation of the heating coil with a reduced battery supply the light 103 does not go on, a low battery condition is indicated to the operator, who then presses the momentary switch 87 to boost the supply of battery energy to the coil 66 to substantially the full energy of the battery. It is to be understood that when the battery 14 is in a high charge condition the initial portion of the battery energy applied on the heating coil 66 is sufficient to heat the conditioning means 34 to a fuel vaporizing temperature, so that the operation of the momentary or booster switch 87 may be eliminated. A positive operation of the heater for the starting system of this invention is thus provided by using the battery energy to the fullest extent at extreme cold temperatures and for a wide range of variation in the effective capacity of the battery.

As previously mentioned, the combined current demand of the motor 46, pump 51, and coil 66 on the battery 14 is only about twenty amperes and when the coil 66 is cut out by the thermostatic switch 95, the total current demand on the battery is only about eight and one-half amperes. On a comparison of this current demand with the engine starting demand of three hundred and twenty-five amperes to four hundred and twenty-five amperes it is apparent that the heater can be operated from the battery when its effective capacity is appreciably below that value required for engine starting purposes. Thus, when the effective capacity of the battery is so reduced by cold temperatures that it is too weak to turn the engine over, the heater 17, because of its low power demand on the battery, is readily operated for battery heating purposes and can be maintained in operation for a time sufficient to increase the battery capacity to an engine starting value without running the battery down any appreciable amount.

To positively start the engine, the battery capacity along with being sufficient to turn the engine over, should also be able to operate the ignition coil 66 at a normal load. For a twelve volt battery at a temperature of 0° F. and operating with current demands of two hundred amperes, three hundred amperes, and four hundred amperes there is a terminal voltage of ten volts, nine volts, and eight volts, respectively. At −30° F. the battery terminal voltage for like amperage loads is nine volts, seven volts, and six volts, respectively. At −50° F. the corresponding terminal voltages for battery loads of two hundred amperes, three hundred amperes, and four hundred amperes, are seven volts, five and one-half volts, and three and one-half volts, respectively. The above voltages at the battery terminals, due to the resistance of the engine starting circuit, will always be higher than the voltage at the ignition coil. With a ten volt coil, and without heating the battery, therefore, it is seen that the ignition is inadequate as soon as temperature conditions drop below 0° F. Conversely, to provide adequate ignition at temperatures below 0° F. the battery should be heated to or maintained at a temperature of at least 0° F. When the temperature is at −40° F. or −50° F. the heating of the battery to 0° F. requires both considerable heat and a relatively long application of heat on the battery to increase the battery temperature forty to fifty degrees. This, of course, is not desirable because it necessitates a considerable delay in engine starting, and a corresponding increase in the drain on the battery by the heater prior to the use of the battery for engine starting. However, other factors must be considered at extreme cold temperatures such as the increased mechanical friction of the engine due to its lubricating oil becoming stiff. These considerations tend to further decrease the voltage delivered to the ignition coil by increasing the starting load on the battery.

In order to overcome these difficulties the engine starting system of this invention includes an ignition circuit for the engine 16 having an ignition coil 107 with a primary P and a secondary S (Fig. 6). The circuit for the ignition coil 107 extends from the battery power lead 70, by way of an ignition switch 109, a conductor 111, a ballast resistor R, conductor 112, the coil primary P and secondary S, conductor 113 and a distributor indicated at 114 connected with spark discharge means 116, six of which are indicated and all of which are connected to a ground 117. A circuit interrupter including breaker points 118 and a condenser 119 is connected by conductor 121 to the junction of the primary and secondary of the coil 107 and by conductor 122 to the ground.

In one embodiment of the invention with a twelve volt battery 14 the coil 107 is constructed so that when three volts is applied on the primary P adequate current is supplied to the spark discharge means 116 for positive engine starting. The construction of the coil 107 to operate at three volts while providing adequate ignition at the spark discharge means 116 is based on the value of the lowest effective capacity of the battery which is capable of turning over the engine 16 at temperatures in the neighborhood of −45° F. The ballast resistor R controls the electrical energy applied on the coil from the battery 14 and for a pressure of twelve volts on the battery produces a voltage of about eight volts. For a high charge condition of the battery, therefore, the ballast resistor maintains a substantially normal load on the coil 107 to prevent its being injured or burned out.

In the starting operation of the engine 16 and so long as there is sufficient voltage at the battery 14, the voltage applied on the primary P of the coil 107 through the ballast resistor R will provide adequate ignition for engine starting purposes. However, at extreme cold temperatures, and a corresponding reduction in the effective capacity of the battery 14, the voltage drop taking place in the ballast resistor R might be so large that the necessary voltage of three volts might not be applied on the primary P of the coil 107. When this condition occurs a shunt circuit for the ballast resistor R is closed to apply the full available energy of the battery 14 directly on the primary P of the ignition coil.

This shunt circuit includes a switch 123 of push button type connected by a conductor 124 to the conductor 111, and by a conductor 126 to the conductor 112. Thus when the effective capacity of the battery 14 is of a reduced value the operation of the switch 123 serves to boost the supply of energy from the battery to the coil to substantially the full energy of the battery. The switch 123, therefore, selectively adapts the ignition system to produce fuel combustion within the engine when the system is energized by the battery voltage which has been increased by heating of the battery but which is still less than the full voltage required for normally producing fuel combustion. As a result, adequate ignition is provided as soon as the engine is turned over by the battery. Because of the low normal voltage applied on the coil 107 the battery 14 may be heated to a temperature appreciably below 0° F. without impairing the efficiency of the ignition circuit. After the engine is in operation the switch 123 is released so that the battery energy is applied on coil 107 through the ballast resistor R.

All of the switches 72, 87, 109, and 123 and the pilot lamp 103 are included in a control box or unit 127 carried on the dash board 128 of the vehicle 10 (Figs. 1 and 3). The control unit is indicated in dotted lines in Fig. 6. The switch 72 is of a rotary type having the switch arms 78 and 83 connected for concurrent pivotal movement by a control knob 145. The ignition switch 109 is of usual type using an operating key (not shown) while the switches 87 and 123 are of push button type which are closed only when held in an operated position. Pilot lamp 103 is positioned centrally of the switch controls so that all of the switches and the pilot lamp 103 are located together for convenient operation and observation.

As was explained above the mechanical friction of the engine 16 is appreciably increased with cold temperatures, and at temperatures of −20° F. and lower it has been found that the engine lubricating oil, even when a light oil is used, becomes so stiff as to provide improper lubrication at engine starting. Also the increased mechanical friction increases the current demand on the battery at engine starting so that if the mechanical friction is reduced a lower available energy of the battery can be used for engine starting. That is, a lower effective capacity of the battery will start the engine at a reduced mechanical friction, than would be possible with the same effective capacity at an increased mechanical friction. In the engine starting system of this invention, therefore, the heater 17 is also used to heat the engine 16.

With reference to Figs. 1 and 2 the outlet 129 for the heated air from the heater 17 is formed with a pair of discharge openings 130 and 131. The opening 130 is connected through a conduit 132 with the battery compartment 11, the battery heating system being closed by a conduit 133 connecting the battery compartment 11 with the heater mechanical compartment 21 at the inlet 134. The discharge opening 131 is connected with a manifold line 136 extended within the engine compartment 13 and having a feeder conduit 137 supplying heated air to the engine intake 138 and carburetor 139, and a second feeder line 141 supplying heated air directly into the breather 142 for the engine crank case. A third feeder line 143 is extended within the passenger compartment 12 for connection with an air distributing box 144 having a valve controlled opening 146 for admitting air into the passenger compartment 12, and a conduit 147 with a valve 148 for controlling the flow of heated air to windshield defrosters 149. Each feeder line 137, 141, and 143 is provided with a like control valve 151 which is shown in detail in Fig. 4. The control valve is seen to be of the usual butterfly type having a control lever 152 for moving the valve into a "closed" or "open" position, or to any position intermediate such two extreme positions.

When the engine 16 and battery 14 are being heated the valve 151 in the feeder line 143 is usually closed so that no heated air is admitted into the passenger compartment 12. To aid the heating of the engine parts the engine compartment 13 can be suitably covered or constructed so as to be substantially air tight with the heated air supplied to the engine compartment 13 through the manifold 136 being returned to the heater 17 for reheating through an open conduit 153 connecting the engine compartment 13 with the heater mechanical compartment 21 at the heater inlet 154. Closed heating systems are thus provided for both the battery 14 and the engine 16 so that the heat developed by the heater 17 is used to its fullest extent and in a most efficient manner for quickly increasing the temperature of the battery and engine at cold temperatures.

After the engine 16 has been started in the manner fully explained above in connection with Fig. 6, it is no longer necessary to supply heat to the engine 16 and the control valves 151 in the heater lines 137 and 141 may be closed and the valve 151 in the heater line 143 opened to admit air into the passenger compartment 12. Heated air is also admitted into the passenger compartment 12 from the battery compartment 11 through a valve controlled opening 156 in the battery housing 158. The valve 159 for the opening 156 is pivotally movable to a closed position relative to the opening 156, as shown in full lines in Fig. 1, and is movable to a second operating position as shown in dotted lines in Fig. 1, to close the conduit 133 connecting the battery compartment 11 with the heater mechanical compartment 21. Thus when the valve 159 is in its full line position a closed heating system is provided for the battery 14, and when the valve 159 is in its dotted line position the heated air from the heater 17, after being circulated about the battery 14, is discharged from the battery compartment 11 through the opening 156 and into the passenger compartment 12. As a result the battery 14, concurrently with the heating of the passenger compartment, is retained at a temperature which provided for its being able to start the engine 16. Also by retaining the battery at an increased temperature relative to outside temperature conditions, it is able to take a greater charge from the engine generator (not shown) as compared to its charge at outside temperatures.

A closed heating system for the passenger compartment 12 is provided by the location of a flap valve 161 (Figs. 1 and 5) located in the open conduit 153 connecting the engine compartment 13 with the heater mechanical compartment 21. The valve in its dotted line position shown in Fig. 5 closes an opening or outlet 162 connecting the conduit 153 with the passenger compartment 12. When the valve 161 is in its full line position shown in Fig. 5 the conduit 153 is closed between the opening 162 and the engine compartment 13 so that the opening 162 is connected with the heater mechanical compartment 21. The heated air admitted into the passenger compartment from the inlet opening 146 in the distributing box 144 and from the inlet 156 in the battery casing 158 is returned through the outlet 162 to the heater 17 to be reheated for later discharge into the passenger compartment 12. Operation of the valve 161 is accomplished by a lever 163 arranged to the outside of the conduit 153.

Figure 7:
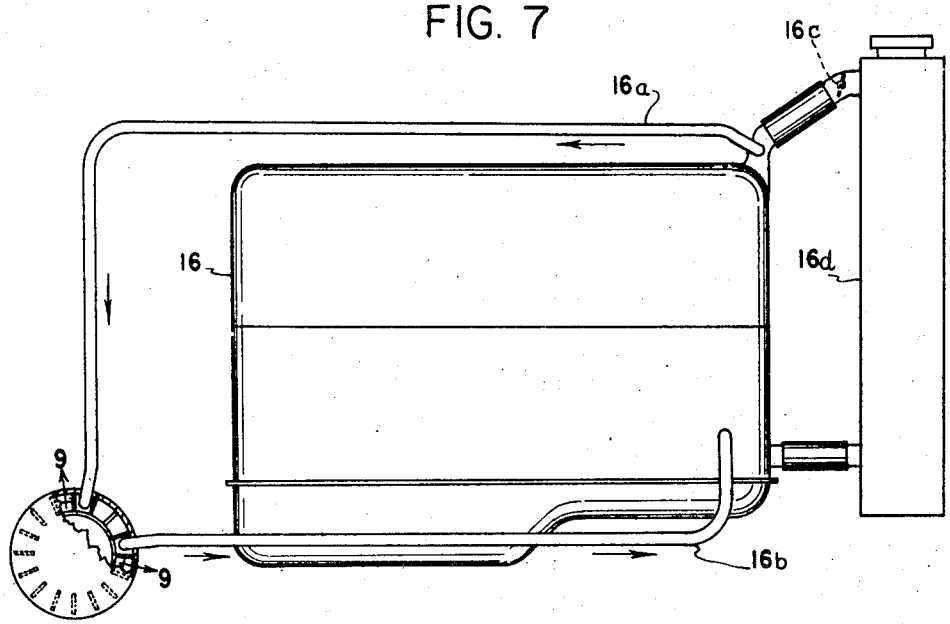
Fig. 7 illustrates the arrangement which may be provided in the system for heating the liquid in the cooling system of the engine.
Figure 8:
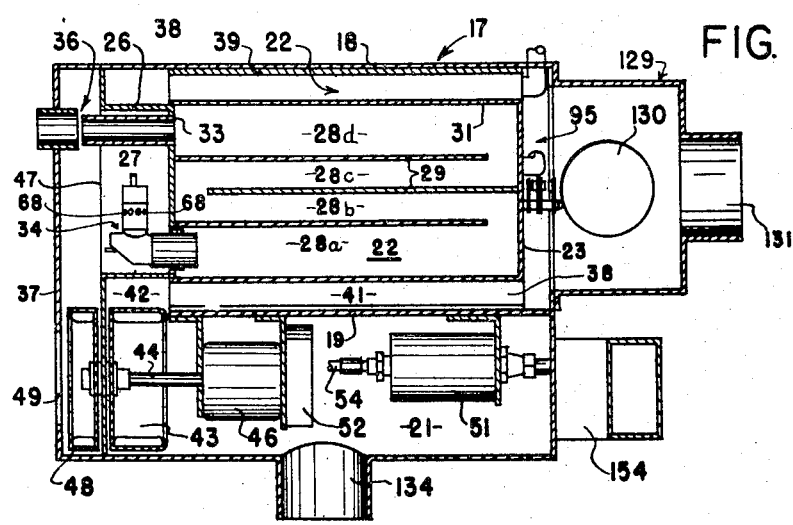
Fig. 8 illustrates the connections which are used to connect the engine cooling system with the heating apparatus.
Figure 9:
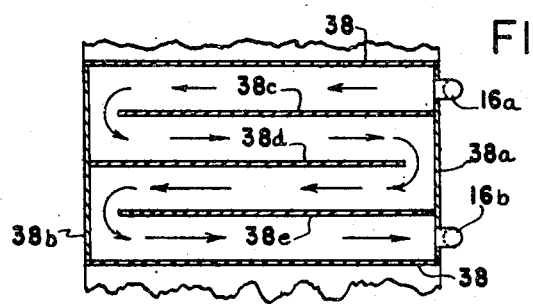
Fig. 9 illustrates in development the arrangement provided in the heating apparatus for circulating the liquid coolant of the engine cooling system about the combustion chamber of the heater.

In order further to reduce at low temperatures the friction between the moving parts of the engine 16 and thus decrease the engine starting load imposed upon the battery 14, the facilities illustrated in Figs. 7, 8 and 9 of the drawings may be embodied in the system in order to heat the liquid coolant which is provided in the liquid cooling system for the engine. Briefly considered, these facilities comprise a liquid heating chamber which partially surrounds the combustion chamber 22 of the heater 17, and hose connections 16a and 16b which serve to connect the liquid heating chamber with the uppermost and lowermost points of the circulating system through which the liquid coolant is circulated through the parts of the engine 16. More specifically, and as best shown in Figs. 8 and 9 of the drawings, an odd number of the fins 38 as provided around the combustion chamber 22 are blocked off at the ends thereof by means of end pieces 38a and 38b so that a closed, fluid tight liquid chamber is provided at the outer side of the wall 31 forming the combustion chamber 22. The three intermediate fins 38c, 38d and 38e as provided in this chamber are shortened at opposite ends thereof so that a sinuous liquid path through the chamber is provided in the manner illustrated in Fig. 9 of the drawings. Those portions of the end plate 38a which overlie the outer extreme ends of this circuitous passage are provided with suitable tubular openings through which connections may be made with the two hose sections 16a and 16b. The opposite end of the hose 16a is preferably connected to the circulating system of the engine 16 at a point in the neck of the engine head which connects with the engine radiator 16d. The connection between this neck and the radiator is conventionally provided with a thermostatically controlled valve 16c which, under low temperature conditions, remains closed to prevent circulation of the liquid coolant through the radiator 16d, thereby to insure a rapid increase in the temperature thereof immediately after operation of the engine 16 is initiated. The end of the hose connection 16b which is removed from the heater 17 may be connected to the lowermost point of the engine circulatory system by removing the threaded drain plug conventionally provided in the engine block and threading the hose end connector into the engine block opening.

It will be understood from the above explanation that all of the facilities illustrated in Figs. 1 to 7, inclusive, of the drawings are also provided in combination with the additional apparatus shown in Figs. 7, 8 and 9 of the drawings, so that the heating of the coolant which is circulated through the engine is entirely supplemental to that produced by transmitting heated air to the various parts of the power plant in the manner described above. With this arrangement, the liquid coolant which enters the heating chamber through the hose connection 16a is circulated through the chamber in heat exchange relationship with the combustion chamber 22 so that the liquid coolant is heated to a relatively high temperature. This coolant as heated within the liquid heating chamber of the heater 17 is returned to the circulating system of the engine 16 through the hose connection 16b, and flows through this circulating system to be returned to the inlet side of the liquid heating chamber through the hose connection 16a. In this regard, it will be understood that the continuous flow of liquid coolant through the circulating system of the engine 16 and the liquid heating chamber of the heater 17 is thermally induced in an entirely conventional manner. Since the circulating system is provided with a thermostatically controlled valve 16c at a point therealong which precludes the circulation of the liquid coolant through the engine radiator 16d, and this valve is, under the low temperature conditions noted, closed to block the circulation of fluid through the radiator, the circulation of the heated liquid coolant is confined to those passages of the circulating system which are provided in the motor block and head of the engine 16. Accordingly, no substantial portion of the heat energy transmitted to the liquid coolant is lost during the circulation of the coolant through the liquid heating compartment or chamber of the heater 17. By virtue of the heated condition of the fluid which is transmitted through the circulating system of the engine 16, the temperature of the moving parts of the engine, and particularly the cylinder walls of the engine, is raised to reduce the mechanical friction between the bearing surfaces of these parts. Thus, after the heating operation has continued for a reasonable time interval to reduce the mechanical friction between the moving parts of the engine, the load which is imposed upon the engine battery 14 during the starting period is correspondingly lowered.

In the embodiments illustrated the heater 17 is capable of developing about 15,000 B. t. u.'s per hour so as to be able to easily heat both the battery 14 and engine 16 even though the current demand of the heater on the battery is very small. At temperatures from —40° F. to —50° F. the invention has been successfully operated from a single twelve volt battery to start and operate an internal combustion engine having a piston displacement of 850 cubic inches. During these engine starting operations the heater was initially operated for about three or four hours, and after such heating operation the engine was started in from nine to twenty seconds.

From the above description, therefore, it is seen that the invention provides an improved system for starting an internal combustion at extreme cold temperatures of —20° F. down to as low as —50° F. by means operated entirely from the starting battery associated with the engine. The complete starting system is very compact, positive acting, and operates so as to use the battery charge to its fullest extent. Adequate ignition for engine starting and operating is provided at the lowest battery charge capable of turning the engine over. Because of this feature the engine starting load on the battery is reduced to a minimum due to the small amount of engine cranking required. Although the invention has been illustrated and described with specific reference to a mobile craft it is to be understood that it may be applied to any power unit including an internal combustion engine and associated starting battery.

It is to be understood further that although the invention has been specifically described with reference to different embodiments thereof, it is not to be so limited since modifications and alterations can be made therein which are within the full intended scope of this invention as defined by the appended claims.

I claim:

1. In a control system for an internal combustion engine having an increased mechanical friction at cold temperatures and including a starting battery with a reduced effective capacity at said cold temperatures such that the battery is incapable of turning over said engine for starting, the combination of means providing for the starting of said engine at said cold temperatures including an ignition system for said engine and a battery-operated heating system of internal combustion type for heating said engine and battery, said heating system having electrical air and fuel supply portions, and electrical means for heating said air and fuel to prepare the same for burning, a coil and an electric discharge means in said ignition system, said coil being of a construction to produce an electrical discharge at said discharge means effective to start said engine at the lowest effective capacity of said battery capable of turning over said engine, with the current demand of said electrical portions and electrical heating means being such as to provide for the operation of said heating system when the effective capacity of said battery is below said lowest effective capacity, a control circuit for said heating system including means for boosting the heat output of said electrical heating means at said cold temperatures, and means for projecting heat to said battery and engine, with said heat reducing the mechanical friction of said engine and increasing the effective capacity of said battery to at least said lowest effective capacity.

2. In a control system for starting the operation of an internal combustion engine at cold temperatures of −20° F. and lower including a starting battery for said engine, with said engine having an increased mechanical friction and said battery having a reduced effective capacity at said cold temperatures, said battery at said reduced effective capacity being incapable of starting said engine at said cold temperatures, the combination of an ignition circuit for said engine including a coil and electrical discharge means, with said coil being of a construction to provide an effective starting spark at said discharge means for the lowest effective capacity of said battery capable of turning over said engine, an electrically operated heater of internal combustion type using said battery as a sole source of power and having electrical portions operable at an effective capacity below said lowest effective capacity of the battery, and means for directing heat from said heater to said battery and said engine, with the heating of said battery increasing its effective capacity to at least said lowest effective capacity, and the heating of said engine reducing the mechanical friction thereof.

3. In a control system for an internal combustion engine having a battery with a reduced effective capacity at cold temperatures of −20° F. and lower, with the battery at these cold temperatures being incapable of turning over said engine for starting, the combination of means providing for the starting of said engine at said cold temperatures including an ignition circuit for said engine and an electrically operated system of internal combustion type for heating said battery operated entirely from said battery, voltage step-up means and electrical discharge means in said ignition circuit, said voltage step-up means being adapted to provide an electrical discharge at said discharge means capable of operating said engine at the lowest effective capacity at which said battery can turn said engine over, resistor means in said ignition circuit for reducing the voltage applied on said voltage step-up means when the effective capacity of said battery is greater than said lowest effective capacity, means in said circuit for rendering said resistor means inoperative when the battery is at said lowest effective capacity, with the electrical portions of said heating system having a current demand such that said heating system is operable when the effective capacity of said battery is below said lowest effective capacity, and means for directing heat to said battery to increase the temperature thereof and raise its effective capacity to at least said lowest effective capacity.

4. In a control system for an engine having a starting battery with a reduced effective capacity at cold temperatures such that the battery is incapable of turning over the engine at said cold temperatures, the combination of means providing for the starting of said engine at said cold temperatures including an ignition system for said engine and an electrical heater of internal combustion type operated solely from said battery and adapted to heat said battery, voltage step-up means and electrical discharge means in said ignition circuit, said voltage step-up means being of a construction to apply a voltage on said electrical discharge means such that an optimum electrical discharge for engine starting occurs at the lowest effective capacity of said battery capable of turning the engine over at said cold temperatures, with said heater having a current drain providing for its operation when the effective capacity of said battery is below said lowest effective capacity, and means for directing heat on said battery to increase the effective capacity thereof to at least said lowest effective capacity.

5. In a control system for an internal combustion engine having a starting battery the effective capacity of which is reduced at cold temperatures so that said battery is ineffective to start said engine, the combination of means providing for the starting of said engine at said cold temperatures including an ignition circuit for said engine having an ignition coil and spark discharge means, with said ignition coil being of a construction to provide adequate current at said discharge means to start said engine at the lowest effective capacity of said battery capable of turning said engine over, a heating system of internal combustion type operated solely from said battery and including electrically operated air and fuel supply portions, and electrical means for heating said air and fuel to an optimum temperature for burning, with said electrically operated air and fuel supply portions and electrical heating means being operable from said battery when the effective capacity thereof is below said lowest effective capacity, a control circuit for said heating system including said electrical heating means and means for boosting the heat output of said electrical heating means for starting said heating system at said cold temperatures, and means for directing heat on said battery to heat the same and increase its effective capacity to at least said lowest effective capacity.

6. In a system for starting a battery-operated engine having an increased mechanical friction at cold temperatures and in which the effective capacity of the battery is reduced by cold temperatures to a value at which the battery is incapable of turning over said engine, with said engine and battery having corresponding compartments, an internal combustion heater provided with means using said battery as a sole source of power, with the electrical means of said heater being operable at a lower effective capacity than is required for turning over said engine, an ignition circuit for said engine including spark means and an ignition coil, said ignition coil being of a construction to produce an optimum spark at said spark means at the lowest effective capacity of said battery capable of turning over said engine, means for controlling said heater to operate the same when the effective capacity of said battery is below said lowest effective capacity, and means for directing heat from said heater to said battery and engine compartments to heat said engine and battery until the effective capacity of said battery is increased to at least said lowest effective capacity.

7. In a power plant, an engine provided with an ignition system which is normally operative to produce fuel combustion within said engine only when energized at a voltage in excess of a predetermined value, an engine starting battery connected to energize said system and having a terminal voltage which may be less than said predetermined value when subjected to an engine starting load under low temperature conditions, a fuel fed heater including at least one element energized from said battery, means for utilizing at least a portion of the heat energy developed by said heater to raise the temperature of said battery, thereby to increase the terminal voltage of said battery, and means for selectively adapting said system to produce fuel combustion within said engine when energized at said increased terminal battery voltage.

8. In combination with a power plant which includes an electrical system having ignition means and having a battery the terminal voltage of which may drop below a predetermined value under low temperature conditions and affect the starting of the power plant, a fuel fed heater operative to supply heat to at least one portion of said plant to facilitate starting of the power plant and including a heating element for producing fuel combustion within said heater, a circuit for energizing said heating element from said battery to normally produce fuel combustion within said heater so long as the terminal voltage of said battery exceeds said predetermined value, and means for controlling said circuit to render said heating element effective to produce fuel combustion within said heater at a terminal battery voltage lower than said predetermined value to supply heat, and provide heat for said one portion of said plant.

9. In combination with a power plant which includes an electrical system having ignition means and having a battery the terminal voltage of which may drop below a predetermined value under low temperature conditions and affect the starting of the power plant, a fuel fed heater operative to supply heat to at least one portion of said plant to facilitate starting of the power plant and including a heating element for producing fuel combustion within said heater, a circuit for energizing said heating element from said battery to normally produce fuel combustion within said heater so long as the terminal voltage of said battery exceeds said predetermined value, means for controlling said circuit to render said heating element effective to produce fuel combustion within said heater at a terminal battery voltage lower than said predetermined value, indicating means, and means for controlling said indicating means to indicate the presence of fuel combustion within said heater.

10. In a power plant, an engine provided with an ignition system which is normally operative to produce fuel combustion within said engine when energized at a voltage in excess of a particular value, an engine starting battery connected to energize said system, said battery having a terminal voltage which may drop below a predetermined value under low temperature conditions and under the same conditions may drop below said particular value when subjected to an engine starting load, a fuel fed heater operative to supply heat to said battery and including a heating element for producing fuel combustion within said heater, a circuit for energizing said heating element to normally produce fuel combustion within said heater so long as the terminal voltage of said battery exceeds said predetermined value, means for controlling said circuit to render said heating element effective to produce fuel combustion within said heater at a terminal battery voltage lower than said predetermined value, and means for selectively adapting said ignition system to produce fuel combustion within said engine when said ignition system is energized at a voltage lower than said particular value.

11. In a power plant, an engine provided with a liquid cooling system and with an ignition system which is normally operative to produce fuel combustion within said engine when energized at a voltage in excess of a predetermined value, an engine starting battery connected to energize said system and having a terminal voltage which may be less than said predetermined value when subjected to an engine starting load under low temperature conditions, a fuel fed heater including at least one element energized from said battery, means for utilizing heat energy developed by said heater to raise the temperature of said battery, thereby to increase the terminal voltage of said battery when subjected to the engine starting load, means for utilizing heat energy developed by said heater to heat the liquid in said liquid cooling system, thereby to raise the temperature of said engine and thus reduce the starting demands on said battery, and means for selectively adapting said ignition system to produce fuel combustion within said engine when energized at said increased terminal battery voltage.

12. In a power plant, an engine provided with a liquid cooling system and with an ignition system which is normally operative to produce fuel combustion within said engine when energized at a voltage in excess of a predetermined value, an engine starting battery connected to energize said system and having a terminal voltage which may be less than said predetermined value when subjected to an engine starting load under low temperature conditions, a fuel fed heater including at least one element energized from said battery and provided with means defining a fuel combustion chamber, means for utilizing heat energy developed by said heater to raise the temperature of said battery, thereby to increase the terminal voltage of said battery when subjected to the engine starting load, means for conducting the liquid in said cooling system into heat exchange relationship with said combustion chamber, thereby to raise the temperature of said engine and thus reduce the starting demands on said battery, and means for selectively adapting said ignition system to produce fuel combustion within said engine when energized at said increased terminal battery voltage.

13. In a power plant, an engine having increased mechanical friction at cold temperatures and including a liquid cooling system, an engine starting battery, a fuel fed heater including at least one element energized from said battery and provided with means defining a fuel combustion chamber, means defining a liquid heating chamber which partially surrounds said combustion chamber, means defining an air heating chamber which also partially surrounds said combustion chamber, means for circulating the liquid in said cooling system through said liquid heating chamber, thereby to raise the temperature of said engine and thus reduce the starting demands on said battery, and means for utilizing heated air from said air heating chamber to raise the temperature of said battery, thereby to increase the load carrying capacity thereof.

14. In a power plant, an engine having increased mechanical friction at cold temperatures and including a liquid cooling system, an engine starting battery, a fuel fed heater including at least one element energized from said battery and provided with means defining a fuel combustion chamber, means defining a liquid heating chamber which partially surrounds said combustion chamber, means defining an air heating chamber which also partially surrounds said combustion chamber, means for circulating the liquid in said cooling system through said liquid heating chamber, thereby to raise the temperature of said engine and thus reduce the starting demands on said battery, and means for conducting heated air from said air heating chamber into contact with at least one portion of said engine for the purpose of further reducing the starting demands on said battery.

15. In apparatus including an engine having an ignition system and a battery for operating said ignition system and in which separate compartments are provided for said engine and said battery and a compartment is provided for the operator of said engine, means for heating said compartments comprising an internal combustion heater energized solely from said battery, said heater including electrical means operable from said battery at a lower effective capacity than is required for turning over said engine so that said heater can be used to heat said battery when the capacity thereof is reduced at low temperatures and the mechanical friction of said engine is increased to an extent that said battery is incapable of starting by said ignition system, conduit means connecting said internal combustion heater with said compartments, and valve means associated with said conduit means and adapted to direct heated air to said engine and battery compartments before starting said engine until the effective capacity of said battery has been increased to at least a value sufficient to turn over said engine, said valve means being adapted to direct heated air only to said operator and battery compartments and to direct heated air from said battery compartment to said operator compartment after said engine is in operation.

HARRY B. HOLTHOUSE.

REFERENCES CITED

The following references are of record in the file of this patent:

UNITED STATES PATENTS

| Number | Name | Date |
|---|---|---|
| 1,214,555 | Leece | Feb. 6, 1917 |
| 1,337,555 | Harris | Apr. 20, 1920 |
| 1,357,598 | Thompson | Nov. 2, 1920 |
| 1,529,906 | Morris | Mar. 17, 1925 |
| 1,953,174 | Hartzell | Apr. 3, 1934 |
| 2,179,322 | Brown | Nov. 7, 1939 |
| 2,257,755 | Morici et al. | Oct. 7, 1941 |
| 2,405,143 | Holthouse | Aug. 6, 1946 |
| 2,405,144 | Holthouse | Aug 6, 1946 |
| 2,405,145 | Holthouse | Aug. 6, 1946 |